United States Patent
Schulz

(10) Patent No.: US 10,436,203 B2
(45) Date of Patent: Oct. 8, 2019

(54) POPPET VALVE

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 19 days.

(21) Appl. No.: 15/767,601

(22) PCT Filed: Oct. 12, 2016

(86) PCT No.: PCT/EP2016/074524
§ 371 (c)(1),
(2) Date: Apr. 11, 2018

(87) PCT Pub. No.: WO2017/064154
PCT Pub. Date: Apr. 20, 2017

(65) Prior Publication Data
US 2018/0340540 A1    Nov. 29, 2018

(30) Foreign Application Priority Data
Oct. 12, 2015 (EP) .................................. 15189427

(51) Int. Cl.
*F16K 17/04* (2006.01)
*F04D 17/08* (2006.01)
(Continued)

(52) U.S. Cl.
CPC .............. *F04D 17/08* (2013.01); *F04B 39/10* (2013.01); *F04B 39/1013* (2013.01);
(Continued)

(58) Field of Classification Search
CPC ...... F04D 17/08; F04B 39/1053; F04B 39/10; F04B 39/1013; F16K 15/066
(Continued)

(56) References Cited

U.S. PATENT DOCUMENTS 1,516,846 A    11/1924  Dever
3,336,942 A    8/1967   Keith et al.
(Continued)

FOREIGN PATENT DOCUMENTS

AT    412302    12/2004
DE    466976    10/1928
(Continued)

OTHER PUBLICATIONS

JP Office Action dated Oct. 17, 2018 for related Patent Application No. 2018-518645, together with English Translation. (11 pages).
(Continued)

*Primary Examiner* — P. Macade Nichols
(74) *Attorney, Agent, or Firm* — Brooks Kushman P.C.

(57) ABSTRACT

A poppet valve for a piston compressor having a catcher, a valve body with a plurality of inlet ducts opening into a valve seat, and a plurality of closing elements which can be moved in an axial direction. Each inlet duct is assigned a closing element, and the valve seat is arranged to lie opposite the associated closing element in the axial direction in such a way that the valve seat can be closed by way of the closing element A spring is arranged between the catcher and the closing element, to bring a pre-stressing force on the closing element, which pre-stressing force is oriented towards the valve seat. The spring encloses an inner space. A guide part which runs in the axial direction is arranged on the catcher, on which guide part the closing element is mounted such that it can move, in the axial direction.

19 Claims, 10 Drawing Sheets

(51) Int. Cl.
 *F16K 15/06* (2006.01)
 *F04B 39/10* (2006.01)
 *F16K 17/00* (2006.01)

(52) U.S. Cl.
 CPC ........ *F04B 39/1053* (2013.01); *F16K 15/063* (2013.01); *F16K 17/003* (2013.01); *F16K 15/066* (2013.01)

(58) Field of Classification Search
 USPC .............................. 137/516.11, 512.1, 543.15
 See application file for complete search history.

(56) References Cited

U.S. PATENT DOCUMENTS

| | | | |
|---|---|---|---|
| 4,489,752 A * | 12/1984 | Deminski | F16K 15/025 137/512.1 |
| 4,852,608 A * | 8/1989 | Bennitt | F04B 39/1053 137/516.13 |
| 6,581,632 B2 | 6/2003 | Walpole et al. | |
| 8,147,255 B2 | 4/2012 | Kuny | |
| 9,309,878 B2 | 4/2016 | Columpsi | |
| 2010/0090149 A1 | 4/2010 | Thompson et al. | |
| 2013/0209298 A1 | 8/2013 | Gaertner et al. | |

FOREIGN PATENT DOCUMENTS

| | | |
|---|---|---|
| DE | 2211415 | 10/1972 |
| DE | 102007016898 | 10/2008 |
| DE | 102008029822 | 12/2009 |
| DE | 102010039516 | 2/2012 |
| EP | 1245881 | 10/2002 |
| EP | 2703647 | 3/2014 |
| GB | 500420 | 2/1939 |
| JP | 2009-92180 A | 4/2009 |
| JP | 2010-8957 A | 4/2010 |

OTHER PUBLICATIONS

International Search Report for PCT/EP2016/074524, English Translation attached to original, Both completed by the European Patent Office dated Jan. 27, 2017, All together 5 Pages.

* cited by examiner

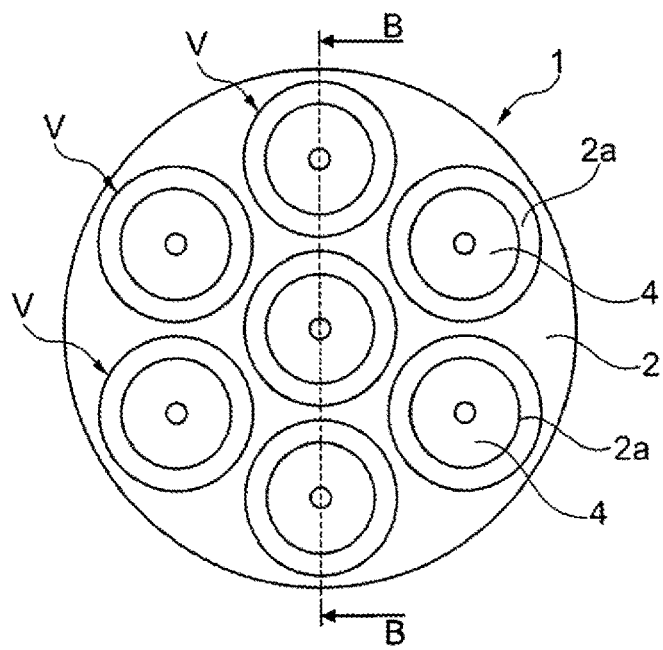
Fig. 1
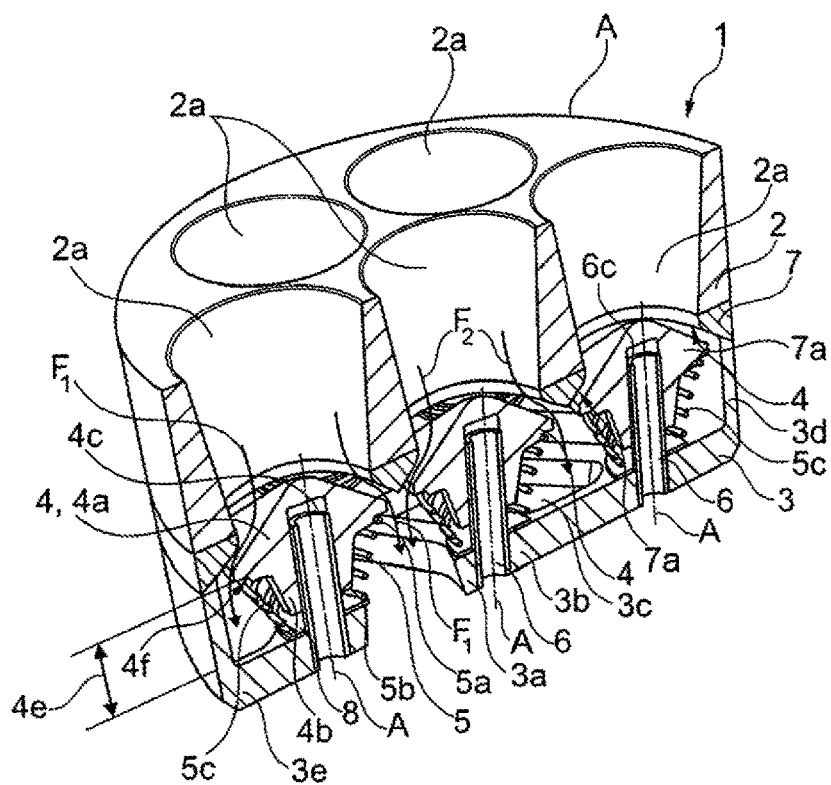
Fig. 2 (B - B)

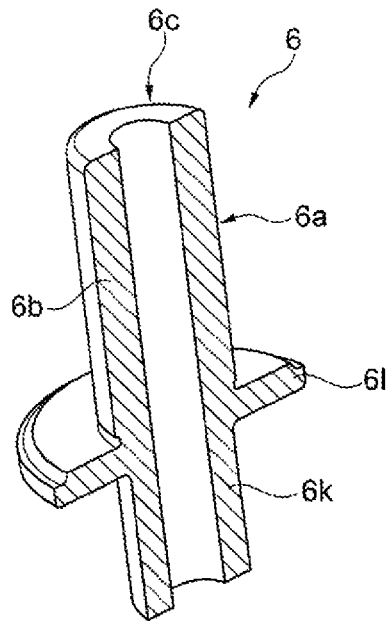
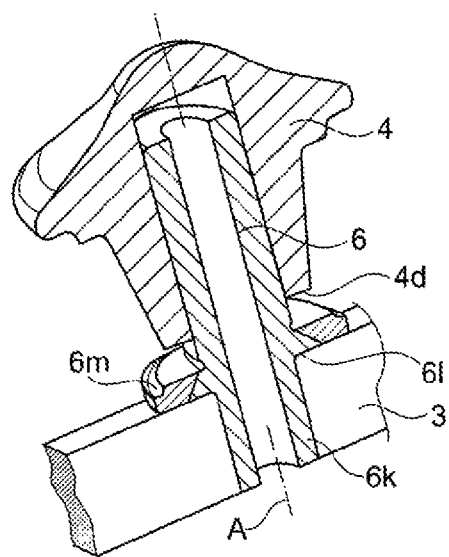
Fig. 19
Fig. 20
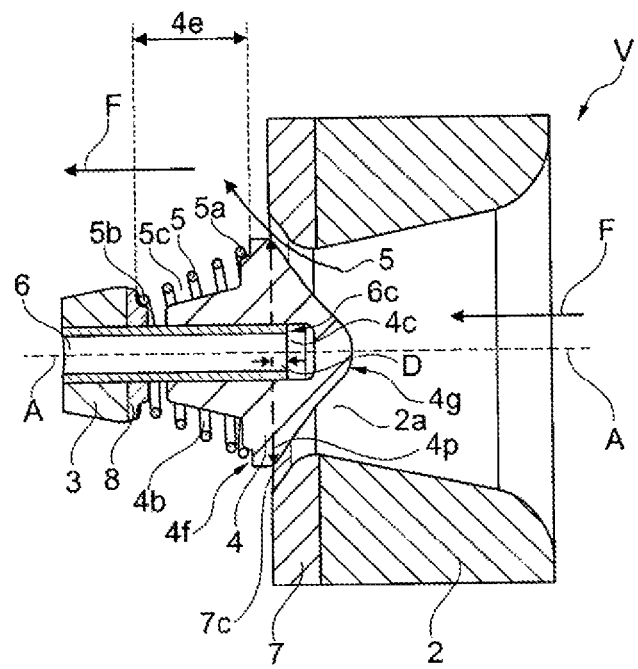
Fig. 21

POPPET VALVE

CROSS-REFERENCE TO RELATED APPLICATION

This application is the U.S. national phase of PCT Application No. PCT/EP16/074524 filed on Oct. 12, 2016, which claims priority to EP Patent Application No. 15189427.6 filed on Oct. 12, 2015, the disclosures of which are incorporated in their entirety by reference herein.

DESCRIPTION

The invention relates to a poppet valve for a piston compressor as per the preamble of claim 1.

PRIOR ART

Each of documents US2010/0090149A1 and EP2703647A1 disclose a poppet valve for a compressor. Said poppet valves exhibit a relatively high degree of wear. Furthermore, said poppet valve exhibits relatively high pressure losses. The document U.S. Pat. No. 4,489,752 discloses a further poppet valve for a compressor. Said poppet valve also exhibits a relatively high degree of wear and still relatively high pressure losses.

PRESENTATION OF THE INVENTION

It is an object of the invention to design a poppet valve for a piston compressor which has more advantageous operating characteristics.

Said object is achieved by means of a poppet valve having the features of claim 1. The subclaims 2 to 18 relate to further advantageous embodiments of the invention.

The object is achieved in particular by means of a poppet valve for a piston compressor, comprising a cage, a valve body with a multiplicity of inlet ducts, wherein each inlet duct opens into a valve seat, and comprising a multiplicity of closing elements which are movable in an axial direction, wherein each inlet duct is assigned a closing element, and wherein the valve seat is arranged so as to be situated opposite the associated closing element in the axial direction in such a way that the valve seat is closable by the closing element, wherein a spring is arranged between the cage and the closing element in order to subject the closing element to a preload force directed toward the valve seat, wherein the spring encloses an interior space, and wherein, on the cage, there is arranged a guide part which extends in the axial direction and on which the closing element is mounted movably, in particular slidingly, in the axial direction, wherein the spring encloses the guide part and the closing element from the outside in an axial direction along a partial section, such that both the guide part and the closing element are, along said partial section, arranged within the interior space of the spring.

Depending on the requirements, the valve body may have different structural forms, and may be designed for example as a valve seat cover, as a hollow cylindrical body or as a cylinder.

In the case of the poppet valve according to the invention, in the preferred embodiment, the closing element is mounted so as to be movable, preferably linearly movable, and preferably slidingly, on a guide part which extends at least partially in the interior of the closing element. Depending on the embodiment, the closing element may be guided in the linear or in the axial direction by means of an internal guide or an external guide. Furthermore, both the guide part and the closing element are arranged in the axial direction along a partial section within the interior space of the spring. The poppet valve according to the invention has the advantage that the holding structure of a cage that holds the guide part can be designed to be very small, in particular if the closing element is internally guided, and if the spring has an exterior cross section which narrows toward the cage. It is furthermore possible for the intermediate space between the guide parts to be designed to be relatively large. This makes it possible for the cage to be provided with large intermediate spaces, in particular with relatively large intermediate spaces that are free from components, which yields the advantage that the fluid flowing through is subjected to a low flow resistance, and that the poppet valve according to the invention exhibits a small pressure drop. In the case of the poppet valve according to the invention, the spring acting on the closing element is arranged such that the spring encloses the guide part and the closing element from the outside in an axial direction along a partial section, such that both the guide part and the closing element are, along said partial section, arranged within the interior space of the spring. The poppet valve according to the invention has the advantage that, in an advantageous embodiment, it has a spring with a larger diameter in relation to poppet valves known from the prior art. A larger diameter has the result that lower stresses arise in the spring, which reduces the wear and increases the service life of the spring. In a particularly advantageous embodiment, the spring has such a large external diameter that the spring lies on the closing element only at a support of the closing element, but is not otherwise in contact with the closing element. The wear of the spring and closing element is additionally reduced in this way. By means of the externally situated spring, which permits a flow around the windings, the structural space is better utilized in relation to a conventional poppet valve in which said space is not available at all for the flow, that is to say the flow cross section in the region of the cage is considerably increased. This leads to lower pressure losses. In a particularly advantageous design, it is additionally also possible for the spring itself to be designed, in terms of proportions, number of windings, wire cross section etc., to be streamlined. The spring which acts on the closing element and which encloses the guide part and the closing element from the outside in an axial direction along a partial section thus advantageously exhibits a low flow resistance, such that a fluid flowing through is subjected to a low pressure loss. Thus, in a preferred embodiment, the poppet valve according to the invention exhibits both a low pressure loss and a low degree of wear, which permits inexpensive and reliable operation. The poppet valve according to the invention has the further advantage that the closing elements and springs can be easily and inexpensively replaced.

Suitable springs are compression springs which extend in a longitudinal direction and which have an interior space in which the guide part and the closing element can be at least partially arranged. What is particularly suitable is a spiral spring or helical spring which extends in a longitudinal direction and which has an interior space which extends in the longitudinal direction. In a particularly advantageous embodiment, the spring has a diameter which increases in the axial direction, wherein the spring is particularly preferably of conical or cone-shaped design. This conical or cone-shaped design, which is spiral-shaped in plan view, has the advantage, in a particularly advantageous embodiment, that the individual windings of the spring, in particular even in the case of a large spring travel, do not make contact with one another or make contact with one another only slightly, which additionally reduces the wear of the spring. Furthermore, a spring of said type requires a smaller structural height of the poppet valve, which yields the advantage inter alia that the dead space in the compressor is made smaller.

The spring may be provided in a multiplicity of possible designs, for example also in the form of a multiplicity of plate springs which are arranged in series in a longitudinal direction and which have an interior space, or a hollow cylindrical rubber spring.

In a particularly advantageous embodiment, the poppet valve according to the invention has a closing element with a face side which faces toward the valve seat, wherein the face side widens in the axial direction toward the cage up to a maximum circumference, wherein the maximum circumference has a circumference central point, and wherein the circumference central point comes to lie within the profile of the guide part at least when the closing element is fully open. This yields particularly advantageous linear guidance of the closing element and reduces the wear of the closing element, in particular when forces and torques engage on the closing element. In a further advantageous embodiment, the circumference central point is arranged so as to lie within the profile of the guide part also when the closing element is closed.

In one advantageous embodiment, it would be possible for the piston compressor to be designed as a diaphragm compressor.

The invention will be described in detail below on the basis of exemplary embodiments.

BRIEF DESCRIPTION OF THE DRAWINGS

In the drawings used for explaining the exemplary embodiments:

FIG. 1 shows a face-on view of a closed poppet valve;

FIG. 2 shows a perspective longitudinal section through the poppet valve as per FIG. 1 along the section line B-B, wherein the closing elements are open;

FIG. 19 shows a perspective longitudinal section of a guide part and a closing element;

FIG. 20 shows a perspective longitudinal section of a guide part;

FIG. 21 shows a longitudinal section through a further valve element of a poppet valve;

In the drawings, identical parts are basically denoted by the same reference designations.

WAYS OF IMPLEMENTING THE INVENTION

Figure 3:
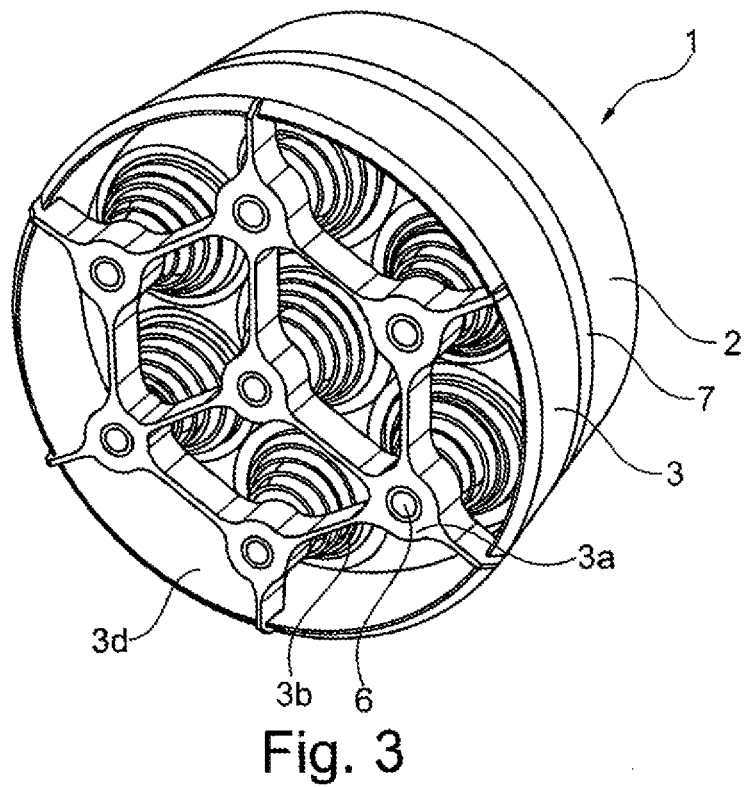
FIG. 3 shows a view of the poppet valve as per FIGS. 1 and 2 from below.

FIG. 1 shows a face-on view of a poppet valve 1 having seven closing valves V, wherein each closing valve V comprises a closing element 4, and wherein the closing elements 4 are in the closed state in FIG. 1. The poppet valve 1 comprises a valve body 2 which is designed as a valve seat cover and which has a multiplicity of inlet ducts 2a. Each inlet duct 2a opens into a valve seat 7a, wherein the valve seat 7a is closed by in each case one closing element 4. FIG. 2 shows a section along the section line B-B through the poppet valve 1 as per FIG. 1, wherein the closing elements 4 are however illustrated in an open state in FIG. 2. The poppet valve 1 comprises at least the valve seat cover 2 with inlet ducts 2a, a cage 3, guide parts 6 which extend in an axial direction A and which are fastened to the cage 3, and a multiplicity of closing elements 4 which are mounted movably, preferably mounted slidingly, in an axial direction A on in each case one guide part 6. Each of the closing elements 4 is assigned in each case one valve seat 7a, wherein the closing elements 4 are in each case arranged so as to be situated opposite the associated valve seat 7a in the axial direction A, and wherein the closing elements 4 are displaceable in the axial direction A such that the valve seat 7a and thus the inlet duct 2a can be opened and closed. The poppet valve 1 furthermore comprises springs 5 for subjecting the closing elements 4 to a preload force directed toward the valve seat 7a or toward the valve seat cover 2. The closing elements 4 are also referred to as poppet or valve cone. The cage 3 comprises a holding structure 3e, which preferably extends perpendicular to the axial direction A, wherein, on the holding structure 3e, there are arranged guide parts 6 which extend in the axial direction A and on which the closing elements 4 are arranged movably or linearly movably, and are preferably mounted slidingly, in the axial direction A. In the exemplary embodiment illustrated, the guide parts 6 are of hollow cylindrical design. In the exemplary embodiment illustrated, the closing elements 4 comprise a closing head 4a and a guide section 4b, wherein the closing element 4 is of concentric design and has, along the axis of symmetry, a bore 4c which forms a plain bearing with the guide part 6, such that the guide part 6 forms an internal guide with respect to the closing element 4. The closing head 4a furthermore comprises a support 4f, which is advantageously of areal design. The spring 5 comprises a first spring end 5a and a second spring end 5b, wherein the first spring end 5a bears against the support 4f, and wherein the second spring end 5b bears directly against the cage 3 or against an interposed spring support 8, in order to subject the closing element 4 to a preload force acting toward the valve seat 7a. The spring 5 has an interior space 5c. The spring 5 encloses the guide part 6 and the closing element 4 from the outside in the axial direction A along a partial section 4e, such that both the guide part 6 and the closing element 4 are, along said partial section 4e, arranged within the interior space 5c of the spring 5. The spring 5 has a diameter which increases in the axial direction A toward the valve seat 7a, wherein, in a preferred embodiment, the spring widens in conical fashion. The spring 5 is advantageously designed such that the spring 5 makes contact with the closing element 4 only at the support 4f. The widening spring 5 has the advantage that the second spring end 5b has a smaller diameter or a smaller support surface than the first spring end 5a, which has the result that, in the region of the cage 3, there is a larger component-free intermediate space that can be flowed through by the fluid F. In FIG. 2, the fluid flows F1, F2 of two valves V arranged so as to be situated adjacent to one another are illustrated by way of example. The fluid flows F1, F2 are diverted transversely with respect to the axial direction A by the face side 4p of the closing element 4, such that the fluid flows F1, F2 flow, as illustrated by way of example, to the cage 3. The crossing fluid flows F1, F2 flow in particular around parts of the adjacent closing element 4 or of the spring 5 thereof. In order that said fluid flows F1, F2 are as far as possible not impeded, the component-free intermediate space, in particular the component-free intermediate space that widens toward the cage 3, is advantageous. The closing elements 4 that narrow toward the cage 3 are particularly advantageous. Also particularly advantageous is the arrangement of the springs 5, because these influence the fluid flow F1, F2 only slightly, preferably to a negligibly small degree.

In a further embodiment, the poppet valve 1 may also be designed so as to comprise only a single inlet duct 2a and a single closing element 4 with spring 5. The poppet valve 1 however preferably comprises a multiplicity of inlet ducts 2a with valve seats 7a and respectively associated closing elements 4 with springs 5, such that the poppet valve 1 forms a multi-seat poppet valve, or a poppet valve 1 with a multiplicity of closing valves V.

In a particularly advantageous embodiment, the poppet valve 1 comprises, as illustrated in FIGS. 2 and 3, a seat plate 7 which is arranged such that the closing head 4a abuts against it and thereby closes the inlet duct 2a, such that the valve seat 7a is formed in the seat plate 7 or by a part of the seat plate 7. The seat plate 7 is a wearing part owing to the valve seat 7a and the closing head 4a acting thereon, and can thus advantageously be easily exchanged. In a further possible embodiment, the seat plate 7 can be omitted, such that the closing head 4a abuts directly against the valve seat cover 2, and the valve seat 7a is part of the valve seat cover 2.

Figure 4:
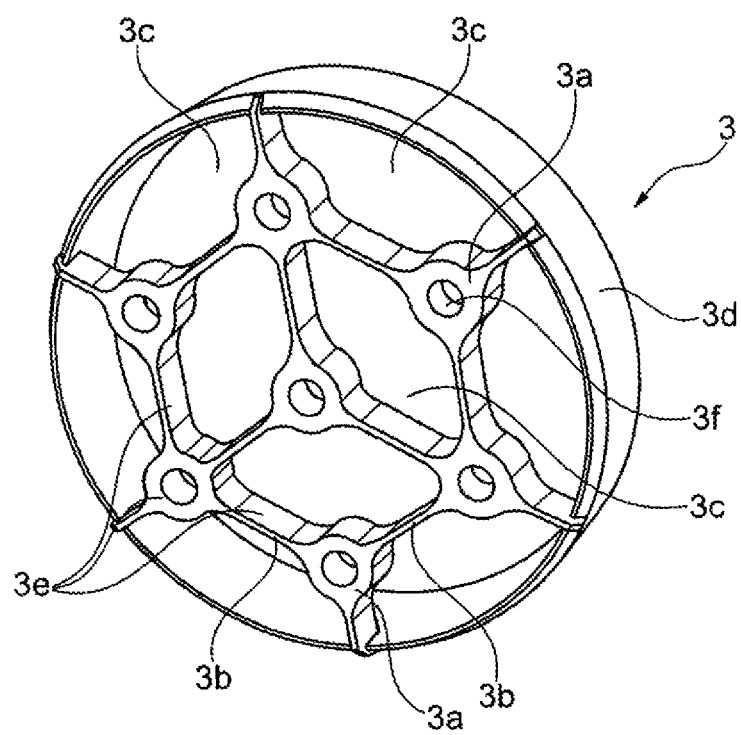
FIG. 4 shows a detailed view of the cage as per FIGS. 2 and 3.

FIG. 3 shows the poppet valve 1 illustrated in FIGS. 1 and 2 in a view from below. FIG. 4 shows the cage 3 illustrated in FIGS. 2 and 3 in detail. The cage 3 advantageously has a holding structure 3e which extends in a planar or flat manner, wherein the holding structure 3e, as illustrated in FIGS. 2 to 4, is preferably designed as a grid structure comprising a multiplicity of struts 3b and junctions 3a, wherein the guide parts 6 are arranged on and advantageously exchangeably fastened to the junctions 3a. Each junction 3a advantageously has a bore 3f in which the guide part 6 is fastened. The illustrated holding structure 3e preferably has large intermediate spaces 3c, which yields the advantage that the fluid flowing in via the inlet ducts 2a can flow unhindered, or substantially unhindered, through the cage 3, such that only very small pressure losses arise. In an advantageous embodiment, the cage 3 comprises, as illustrated in FIGS. 3 and 4, a hollow cylindrical outer wall 3d, which extends in the axial direction A and which encloses the holding structure 3e in the circumferential direction. The cage 3 thus acts as a valve protection arrangement, also referred to as "valve guard".

Figure 5:
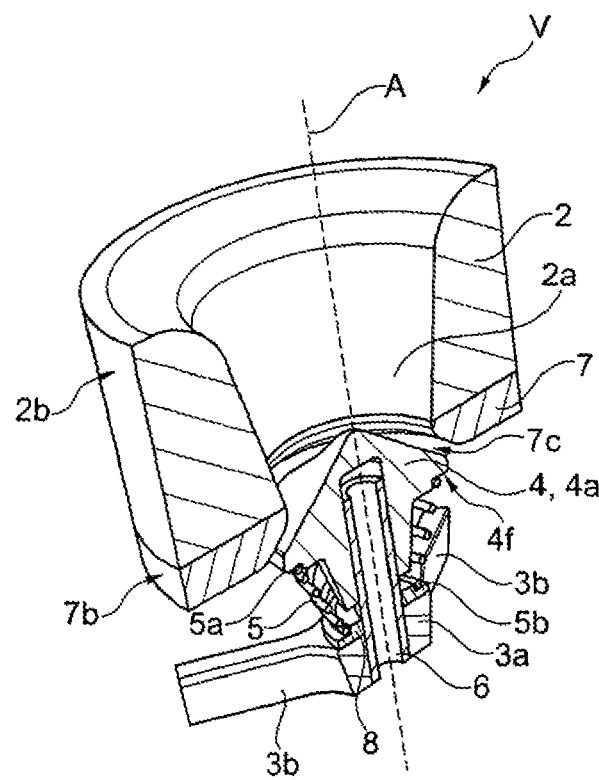
FIG. 5 shows a perspective longitudinal section through a single valve element of a poppet valve as per FIG. 2.
Figure 6:
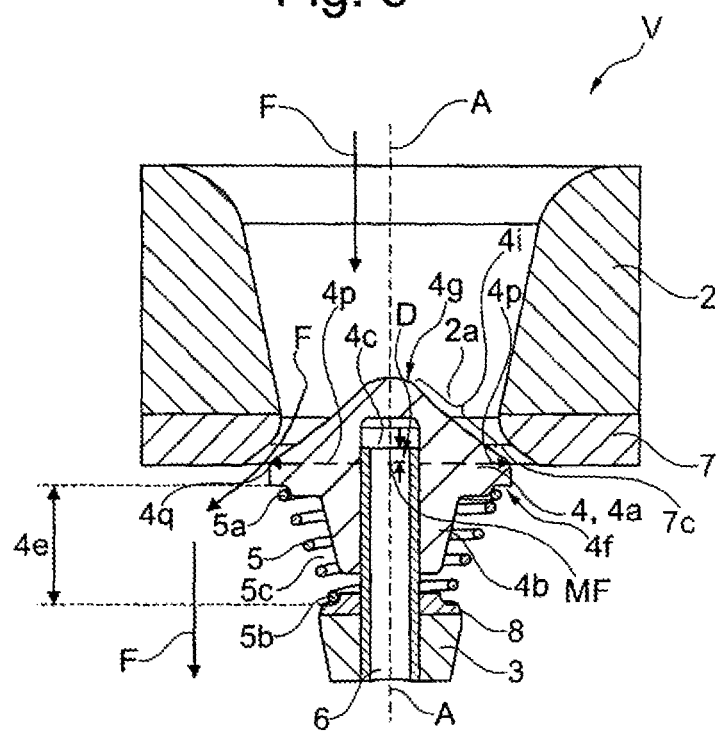
FIG. 6 shows a plan view of the section as per FIG. 5.

FIGS. 5 and 6 show a single closing valve V of the poppet valve 1 illustrated in FIGS. 1 to 3 in detail. The outer surfaces 2b and 7b are themselves section planes, but are illustrated without hatching in order to provide a clearer illustration of the other features. The spring 5 has an interior space 5c and is, along the partial section 4e, designed and arranged such that the spring 5 encloses both the guide part 6 and the guide section 4b of the closing element 4 from the outside, wherein the spring 5 is in direct contact with the closing element 4 only at the first spring end 5a, and is supported on or bears against the support 4f. The spring 5 is of conically extending design in the side view as per FIG. 6, and in plan view is designed so as to extend in spiral-shaped fashion, wherein the windings of the spring 5 are preferably designed such that adjacent windings cannot strike one another during a movement of the closing element 4 in the axial direction A. The windings are advantageously spaced apart from the guide section 4b to such an extent that the spring 5 does not rub against or make contact with the closing element 4 other than at the support 4f, which results in an extremely low degree of wear of the spring 5 and of the guide section 4b. The support 4f may be provided in a multiplicity of possible designs, and may for example have depressions for guiding the first spring end 5a, or fastening means for guiding and/or holding the first spring end 5a. The poppet valve 1 according to the invention has the advantage that a fluid F flowing through is subjected to only a low flow resistance.

As can be seen in particular from FIG. 6, the closing element 4 has a face side 4g facing toward the inlet duct 2a, wherein said face side 4g is designed so as to extend in substantially conical or arrow-shaped fashion. The face side 4g may be provided in a multiplicity of possible designs. In the case of a multi-seat poppet valve 1, that is to say a poppet valve 1 comprising a multiplicity of closing valves V, which is used in combination with a high-pressure gas compressor, it is advantageous for the face side 4g to be of aerodynamic design, advantageously by virtue of the face side 4g extending in conical, arrow-shaped and/or convex fashion and extending with a smoothly extending curvature from the center to the edge of the face side 4g, wherein the curvature may preferably also have concavely extending sections 4i. This design reduces the pressure loss at the face side 4g and/or conducts the fluid flow F transversely with respect to the axial direction A such that, as can be seen from the partial flows F1, F2 in FIG. 2, said fluid flow, after passing through the valve seat 7a, flows preferably through the component-free intermediate space and thereafter through an intermediate space 3c of the cage 3.

As can be seen from FIG. 6, the closing element 4 has a closing head 4a with a face side 4g facing toward the valve seat 7a, wherein the face side 4g, or the cross section of the closing element 4 as illustrated in FIG. 6, widens in the axial direction A from the inlet duct 2a to the cage 3 up to a maximum circumference 4q, such that a maximum external diameter 4p is formed. The maximum circumference 4q and the maximum external diameter 4p are for example also indicated in the illustration of FIG. 15. As can be seen from FIG. 6, the maximum external diameter 4p comprises those points of the closing element 4 which, with respect to a line perpendicular to the axial axis A, have the greatest spacing to the axial axis A. Also illustrated in FIG. 6 is the circumference central point $M_F$ of the maximum circumference $4q$ or of the maximum external diameter $4p$. This circumference central point $M_F$ is situated in the guide interior space $4c$ of the closing element 4. In the case of a fluid flowing through the open valve V, the flow force acting in the region of the maximum circumference $4q$ often causes the greatest torque, which engages on the closing element 4. The circumference central point $M_F$ furthermore forms the central point of said acting torque.

As illustrated in FIG. 6, the closing element 4 and the guide part 6 are designed and arranged in a manner adapted to one another in the valve V such that the guide part 6 ends, in the direction of the inlet duct 2*a*, at a guide part end 6*c*, and such that, at least when the closing element 4 is fully open, the circumference central point $M_F$ comes to lie within the profile of the guide part 6, that is to say comes to lie within the distance along which the guide part 6 extends in the axial direction A, or in other words, such that, at least when the closing element 4 is fully open, the circumference central point $M_F$ is situated closer to the cage 3 than the guide part end 6*c* of the guide part 6 in the axial direction A. As illustrated in FIG. 6, the circumference central point $M_F$ is spaced apart from the guide part end 6*c* by a distance D. Said distance D is greater than or equal to 0 mm at least when the closing element is fully open. Said distance D is advantageously greater than or equal to 0 mm also when the closing element 4 bears against the valve seat 7*a*. This embodiment has the advantage that the circumference central point or the center of rotation $M_F$ of a torque acting on the closing element 4, in particular of a torque acting on the maximum circumference $4q$ or on the maximum external diameter $4p$, lies in a region at which the closing element 4 bears against the guide part 6 and is guided by the latter in the axial direction A. This reduces or prevents tilting of the closing element 4 with respect to the guide part 6, and this furthermore reduces the wear of the guide interior space $4c$ of the closing element 4 and the wear of the guide part 6. The described arrangement thus ensures excellent linear guidance of the closing element 4 in the axial direction A. This linear guidance is of particular importance because, in the open state, the closing element is subjected by the fluid flow F and resulting flow turbulences to different, temporally varying and in part relatively high forces on the closing element 4, which seek to deflect the closing element 4 out of the movement in the axial direction A. Such a deflection of the movement results in the possibility of the closing element 4 abutting at one side against the valve seat 7*a*, which considerably increases the wear on the face side 4*g* of the closing element 4. Furthermore, the wear in the guide interior space $4c$ increases, such that the closing element 4 is guided less effectively in the axial direction, which in turn causes faster wear of the face side 4*g*. The described embodiment of the closing element in combination with the arrangement of the guide part 6 thus has the advantage that the wear is significantly reduced.

Figure 7:
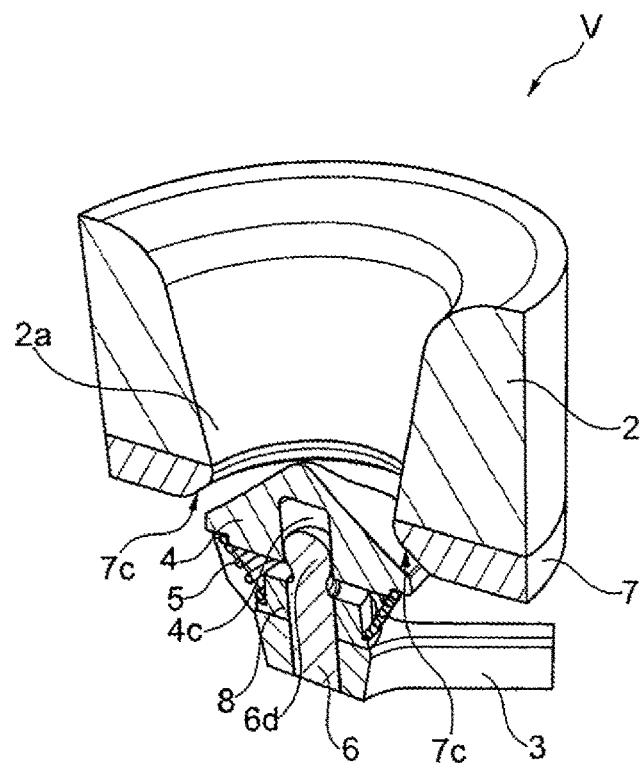
FIG. 7 shows a perspective longitudinal section of a second exemplary embodiment of a valve element of a poppet valve.

FIGS. 7 to 11 show further exemplary embodiments of single closing valves V that could be used in the poppet valve 1 illustrated in FIGS. 1 to 3. FIG. 7 shows a second exemplary embodiment of a closing valve, wherein the guide part 6 has a spherical end part 6*d*, such that the closing element 4 can perform not only the linear movement or the sliding movement but also a tilting movement relative to the guide part 6. In this way, the closing element 4 can, in the closed state, adapt to the position or the profile of the valve seat 7*a* in a particularly effective manner.

Figure 8:
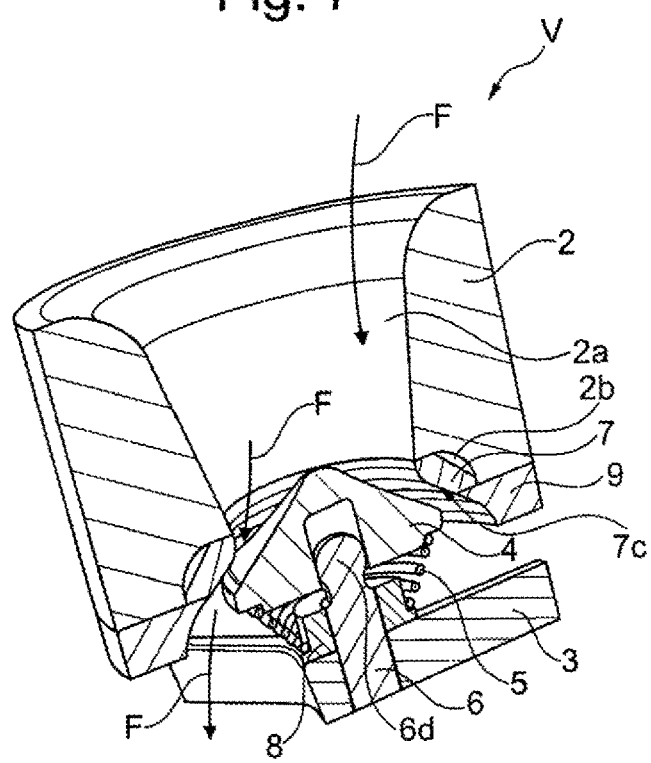
FIG. 8 shows a perspective longitudinal section of a third exemplary embodiment of a valve element of a poppet valve.

FIG. 8 shows a third exemplary embodiment of a closing valve. Arranged under the valve seat cover 2 is a fluid-guiding plate 9 which serves for realigning the inflowing fluid F after it passes the inlet opening 2*a* and the closing element 4, preferably into a flow direction extending substantially parallel to the axis A. The valve seat cover 2 advantageously comprises a groove 2*b* in which a ring-shaped wearing part 7 is arranged. The ring-shaped wearing part 7 has the advantage that it can be particularly easily replaced, and that materials can be used that are less suited to a plate-like design as illustrated in FIG. 7 with the seat plate 7. Suitable materials for the ring-shaped wearing part 7 are for example plastic, such as PEEK (polyether ether ketone) and in particular fiber-reinforced PEEK, or elastomers, in particular rubber-like materials, or else metal. In one advantageous embodiment, the ring-shaped wearing part 7 is manufactured from metal. The poppet valve 1 illustrated in FIG. 8 has the further advantage that the wearing part 7 is arranged within the structural height of the valve seat cover 2, such that no plate-shaped seat plate is necessary. This makes it possible to provide a greater thickness of the valve seat 7*a* or a smaller structural height of the poppet valve 1. In a further possible embodiment, it would also be possible in the case of the poppet valve 1 illustrated in FIG. 8 to omit the fluid-guiding plate 9. It would furthermore also be possible for the guide part 6 to be designed, as illustrated in FIG. 5, as a linearly extending guide part 6 without a spherical end part 6*d*.

Figure 9:
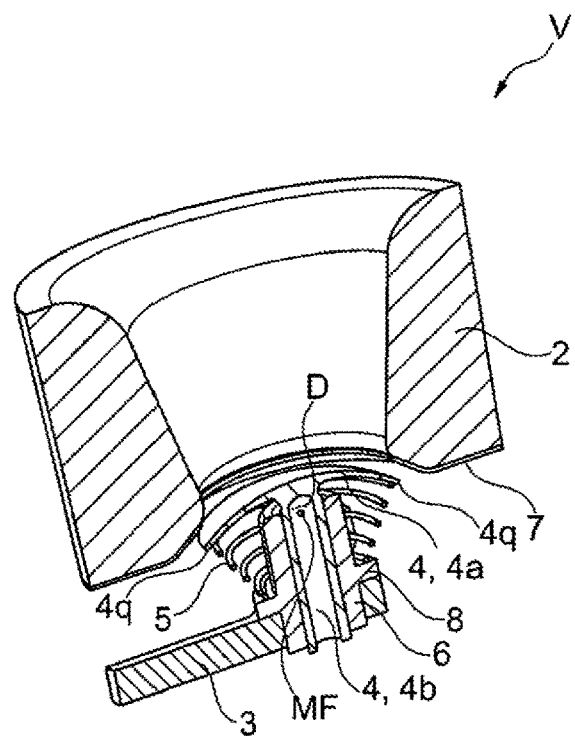
FIG. 9 shows a perspective longitudinal section of a fourth exemplary embodiment of a valve element of a poppet valve.

FIG. 9 shows a fourth exemplary embodiment of a closing valve. The guide part 6 is of hollow cylindrical design. The closing element 4 comprises a cylindrical guide section 4*b*, and the guide part 6 and the guide section 4*b* are designed to be adapted to one another such that they form a plain bearing in the axial direction A. In this embodiment, the closing element 4 can be produced particularly inexpensively and so as to have a low mass. In one advantageous embodiment, the closing element 4 is produced from metal. In a further advantageous embodiment, the closing element 4 is formed in two parts and comprises a closing head 4*a*, designed as a valve disk, and a guide section 4*b*, designed as a pin or as a cylindrical tube. The closing head 4*a* and the guide section 4*b* are advantageously manufactured from different materials, and are preferably formed in two parts and connectable to one another by means of a connection, for example a clip connection, in a simple manner. It would for example be possible for the closing head 4*a* to be manufactured from metal and for the guide section 4*b* to be manufactured from a plastic. In the exemplary embodiment as per FIG. 9, the maximum external diameter 4*g* and the end 6*c* of the guide part 6 are again preferably designed, as already described in FIG. 6, such that the distance D is greater than or equal to 0 mm at least when the closing element 4 is fully open, and is advantageously greater than or equal to 0 mm also when the closing element 4 is closed.

Figure 10:
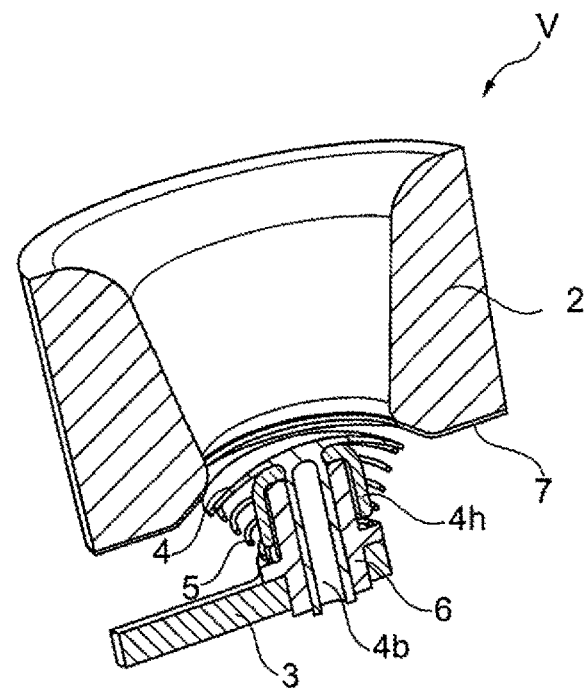
FIG. 10 shows a perspective longitudinal section of a fifth exemplary embodiment of a valve element of a poppet valve.

FIG. 10 shows a fifth exemplary embodiment, in which the closing element 4 is, in relation to the embodiment illustrated in FIG. 9, furthermore also guided at the outside on the guide part 6 by means of an external guide 4*h*. In a further possible embodiment, it would also be possible in the case of the closing element 4 illustrated in FIG. 10 for the guide section 4*b* to be omitted, such that the closing element is guided only by means of the external guide 4*h*.

Figure 11:
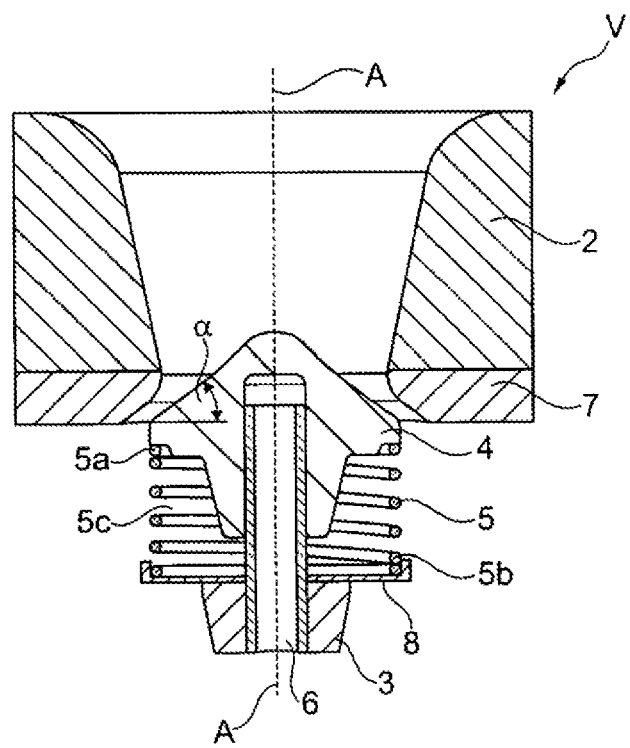
FIG. 11 shows a perspective longitudinal section of a sixth exemplary embodiment of a valve element of a poppet valve.
Figure 12:
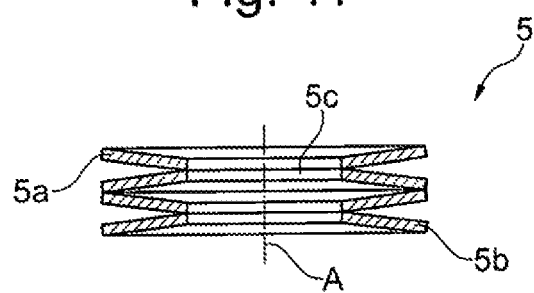
FIG. 12 shows a further exemplary embodiment of a compression spring.
Figure 13:
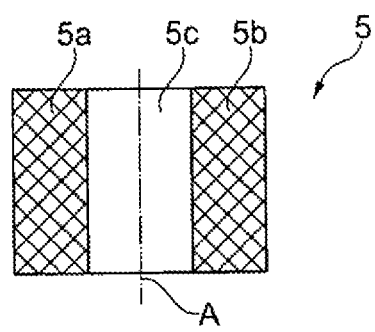
FIG. 13 shows a further exemplary embodiment of a compression spring.

FIG. 11 shows a sixth exemplary embodiment, in the case of which the spring 5 is designed as a parallel-extending spiral spring or helical spring. FIG. 12 shows a further exemplary embodiment of a compression spring 5 with an interior space 5*c*, wherein the compression spring 5 comprises a multiplicity of disk springs which are arranged so as to follow one another in a stack in the direction of extent of the axis A. FIG. 13 shows a further exemplary embodiment of a compression spring 5 with an interior space 5c, wherein the compression spring 5 is designed as a rubber spring.

The poppet valve 1 according to the invention makes it possible to use springs 5 which have a greater external diameter in relation to known poppet valves. The greater spring diameter yields the advantage that the stresses in the spring are considerably reduced. In the case of the same travel, spring constant and material, the stress in a cylindrical spring is dependent on the mean diameter of the spring. In relation to the prior art, the poppet valves 1 according to the invention have a much greater mean spring diameter, such that the springs 5 that are used exhibit lower stress and ultimately a lower degree of wear. In the case of the poppet valve 1 according to the invention, it is furthermore possible to use springs 5 with a smaller number of windings and to nevertheless keep the stresses in the spring 5 in a tolerable range. The poppet valve according to the invention thus has the advantage that springs 5 with a smaller number of windings can be used, such that the structural height of the entire poppet valve can advantageously be reduced.

Figure 14:
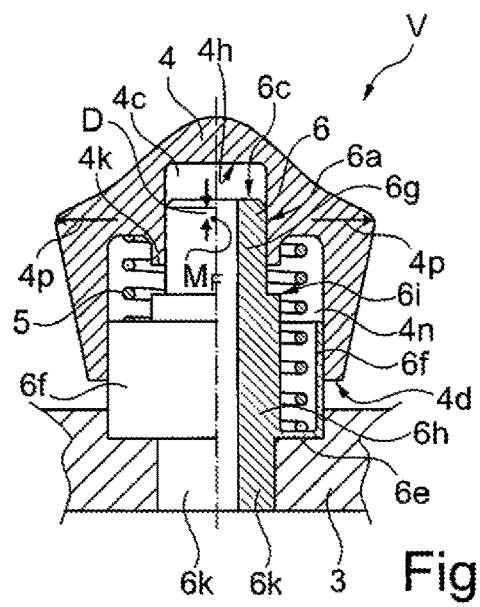
FIG. 14 shows a longitudinal section through a seventh exemplary embodiment of a single valve element of a poppet valve.

FIG. 14 shows a seventh exemplary embodiment of a single valve element V of a poppet valve, in longitudinal section on the right and partially in longitudinal section on the left. The guide part 6 is fastened by means of a fastening section 6k to the cage 3. The guide part 6 comprises a section 6h of relatively large diameter, a shoulder 6i and subsequently a section 6g of relatively small diameter. The guide part 6 furthermore comprises a base part 6e, proceeding from which there is arranged a hollow cylindrical external guide 6f. The guide part 6 furthermore comprises a face or end side 6c. The closing element 4 comprises a first guide interior space 4c, which bears against the section 6g of relatively small diameter, and comprises a second guide interior space 4n, which bears against the external guide 6f, such that the closing element 4 bears against the section 6g and against the external guide 6f. The spring 5 is arranged in the second guide interior space 4n. The stroke travel in the axial direction A is limited by the second stop 4h and the face side 6c of the guide part and/or by the shoulder 6i and the third stop 4k and/or by the first stop 4d and the surface of the cage 3. In the exemplary embodiment as per FIG. 14, the closing element 4 is guided in a linear direction, that is to say in the direction of extent of the axis A, in a particularly effective manner.

Figure 15:
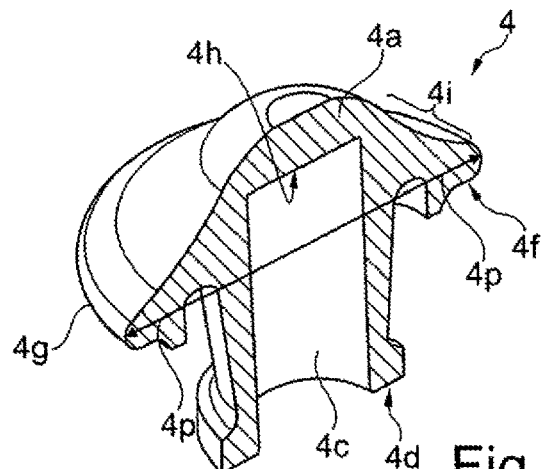
FIGS. 15-18 show in each case one perspective longitudinal section of further exemplary embodiments of closing elements.

FIG. 15 shows a perspective longitudinal section of a closing element 4, comprising a closing head 4a with a maximum external diameter 4p, wherein the closing head 4a comprises a concavely extending section 4i. Furthermore, the closing element 4 comprises a guide interior space 4c with a second stop 4h, a first stop 4d of increased wall thickness, and a spring support 4f.

Figure 16:
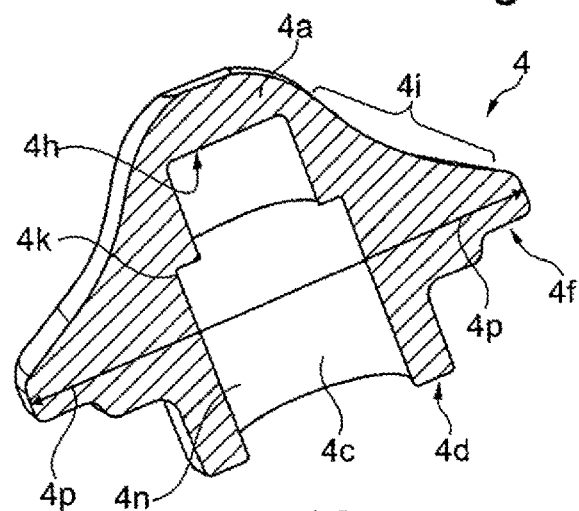

FIG. 16 shows a perspective longitudinal section of a closing element 4, comprising a closing head 4a with a maximum external diameter 4p, wherein the closing head 4a comprises a concavely extending section 4i. Furthermore, the closing element 4 comprises a guide interior space 4c with a second stop 4h, a second guide interior space 4n of relatively large internal diameter, such that a third stop 4k is formed, a first stop 4d of increased wall thickness, and a spring support 4f.

Figure 17:
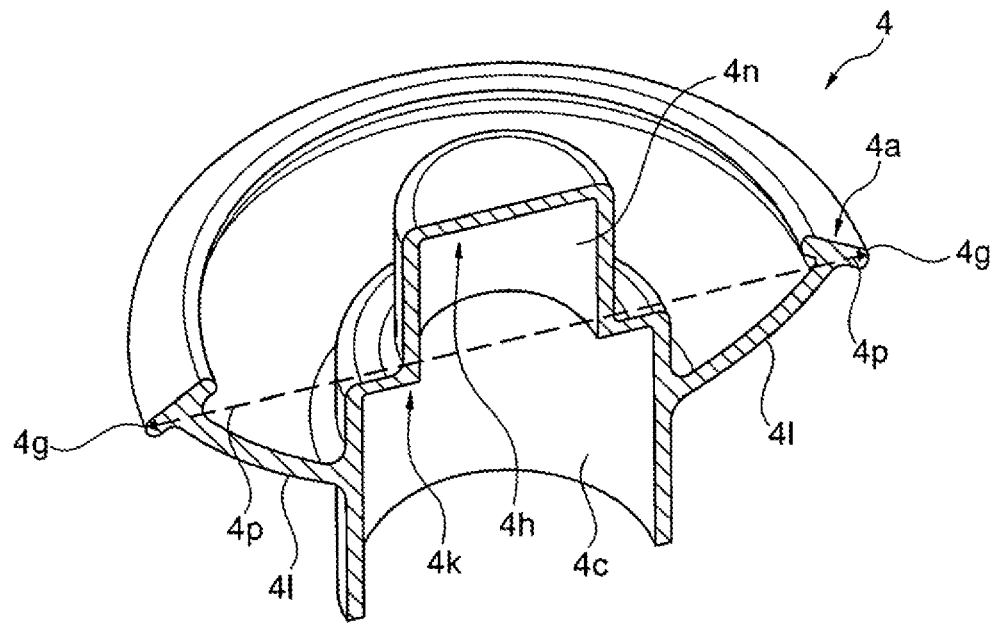

FIG. 17 shows a perspective longitudinal section of a closing element 4, comprising a closing head 4a with a maximum external diameter 4p, wherein the closing head 4a is connected by means of a connecting part 4l to the guide section 4c. The guide section 4c comprises a second stop 4h, which closes off the guide section 4c in gas-tight fashion in an upward direction. The guide section 4c may have the same internal diameter along the entire length or, as illustrated in FIG. 17, may have a shoulder 4k, such that the second guide interior space 4n has a smaller internal diameter than the preceding guide interior space 4c. The closing element 4 illustrated in FIG. 17 is preferably produced from metal, preferably from a thin metal, such that the closing element 4 advantageously has a low weight and advantageously has a high degree of wear resistance.

Figure 18:
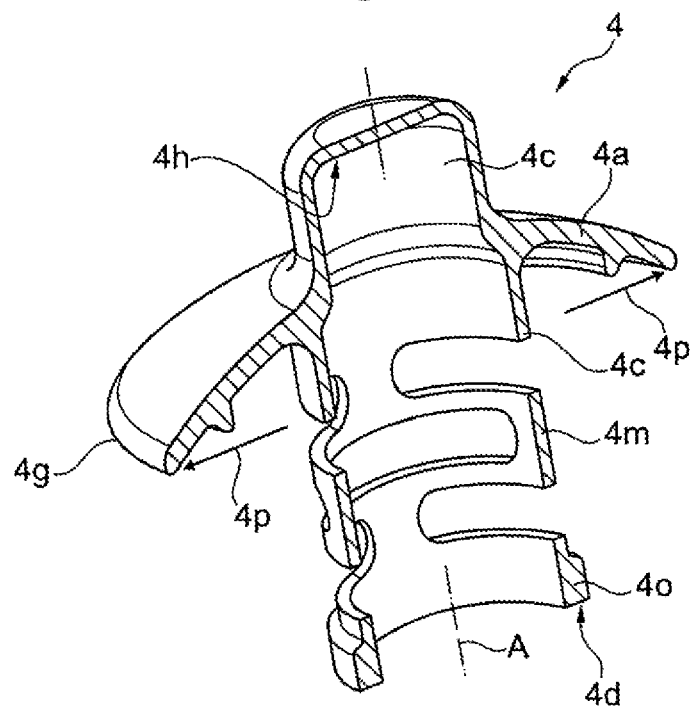

FIG. 18 shows a perspective longitudinal section of a closing element 4 comprising a closing head 4a with a maximum external diameter 4p. The closing element 4 furthermore comprises a guide interior space 4c with a second stop 4h. The closing head 4a is connected by means of a spring section 4m to the base part 4o, wherein the base part 4o furthermore forms the first stop 4d. The spring section 4m is preferably composed of the same material as the rest of the closing element 4, wherein the closing element 4 is preferably composed of one piece. The recesses in the outer wall of the spring section 4m may be designed in a variety of ways in order to provide the closing element 4 with resilient characteristics in the axial direction A between the closing head 4a and base part 4o.

FIG. 19 shows a perspective longitudinal section through a guide part 6 and through a closing element 4 which is mounted displaceably and linearly movably in the axial direction A on the guide part. The guide part furthermore comprises a stop 6l, following which there is arranged a fastening section 6k. The stop 6l serves as a stop for limiting the insertion depth of the fastening section 6k into the cage 3. In an advantageous embodiment, the fastening section 6k is surrounded by a spring section 6m which has resilient characteristics in the axial direction A. It would also be possible for the guide part 6 to be formed in one piece, wherein it would be possible for the material of the spring section 6m to be manufactured from a softer and/or more elastic material than the rest of the guide part 6.

FIG. 20 shows a perspective longitudinal section through a guide part 6 comprising a stop part 6l which projects in the radial direction, a fastening section 6k and a guide section 6b with a cylindrical surface 6a and face side 6c.

FIG. 21 shows the valve V that has already been illustrated in FIG. 6, wherein the valve V is, in FIG. 21, arranged in a vertically extending valve body 2.

Figure 22:
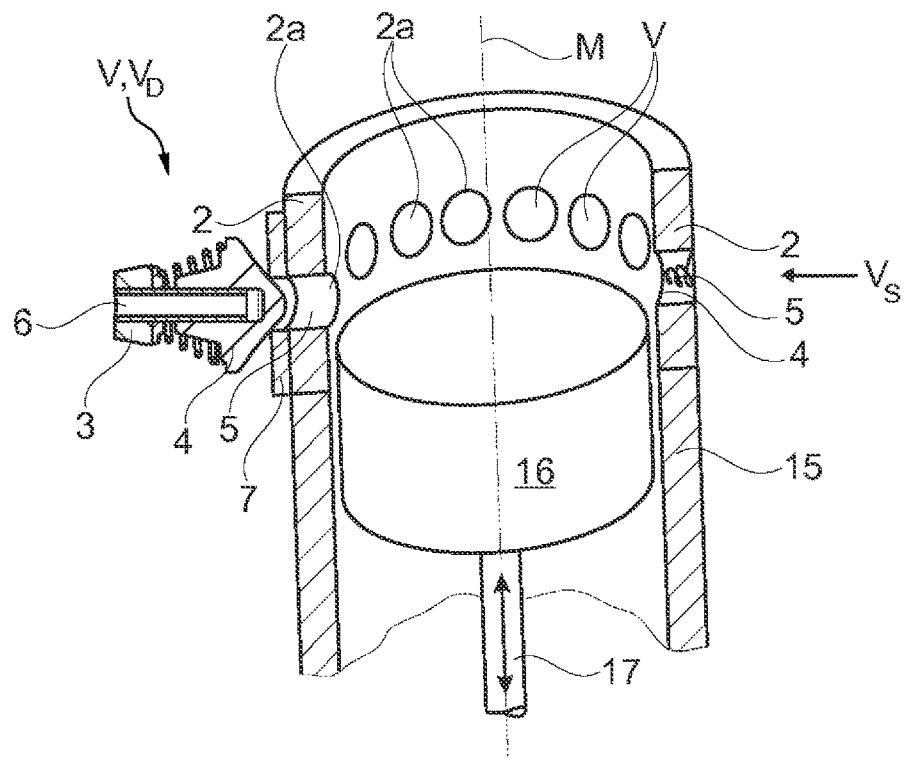
FIG. 22 shows a poppet valve having a cylindrical valve body with a multiplicity of valves.

FIG. 22 shows a longitudinal section through a piston compressor comprising a cylinder 15, a piston 16, and a piston rod 17, wherein the piston 16 is mounted so as to be movable back and forth in the direction of extent of the central axis M of the cylinder 15. Arranged so as to adjoin the cylinder 15 at the top is a hollow cylindrical valve body 2, having a multiplicity of valves V which are arranged spaced apart from one another in the circumferential direction. The individual valves V are designed for example as illustrated in FIG. 21, wherein the holding plate 7 is of hollow cylindrical design and encloses the valve body 2. A cage 3 is also required, which is connected to the valve body 2 or to the cylinder 15 and which, in an advantageous embodiment, encloses the valve body 2. FIG. 22 shows, at the top left, a valve V which is arranged as a pressure valve $V_D$, in the case of which the inlet ducts 2a begin at the inner side of the cylinder 15, such that the closing elements 4 are arranged toward the outside. The inlet ducts 2a extend preferably radially with respect to the central axis M of the cylinder 15. The valves V may also be arranged in a reversed manner, as illustrated at the top right in FIG. 22, wherein the inlet ducts 2a begin at the outer side, and the closing elements 4 are arranged toward the inner side of the cylinder

15, such that the valve V acts as a suction valve $V_S$. It would also be possible for the valve body 2 to be designed as part of the cylinder 15, for example by virtue of the cylinder having bores which form the inlet duct 2a and preferably also the valve seat 7a. It would furthermore be possible, as illustrated at the top in FIG. 22, for a further hollow cylindrical valve body 2 comprising valves V to be arranged below the cylinder 15 in the direction of extent of the central axis M, in particular if the cylinder 15 is of double-acting design. Depending on requirements, the valves V may be arranged in the valve body 2 or in the cylinder 15 as pressure valves $V_D$ and/or as suction valves $V_S$. There are numerous possibilities for the arrangement of the pressure valves $V_D$ and of the suction valves $V_S$. For example, in FIG. 23, it would be possible for every second one of the valves V arranged spaced apart in the circumferential direction to be designed as a pressure valve $V_D$ and for every second to be designed as a suction valve $V_S$, such that in each case one pressure valve $V_D$ and one suction valve $V_S$ are arranged so as to follow one another in the circumferential direction. In a further exemplary embodiment, it would be possible for all of the pressure valves $V_D$ or all of the suction valves $V_S$ to be arranged in the circumferential direction with respect to the central axis M along a predefined angle of for example 90°, 180° or 360°. Accordingly, it would for example be possible in FIG. 22 for all of the pressure valves $V_D$ to be arranged along 180° and subsequently for all of the suction valves $V_S$ to be arranged along 180°, such that all of the valves V are arranged in the cylinder 15 or in the valve body 2 at the same height in the direction of extent of the central axis M. In a further exemplary embodiment, the valves V may also be arranged offset in the direction of extent of the central axis M, such that for example the pressure valves $V_D$ are arranged along a predefined angle of for example 90°, 180° or 360°, and such that the suction valves $V_S$ are arranged along a predefined angle of for example 90°, 180° or 360° but so as to be offset in the direction of extent of the central axis M. It would also be possible for the pressure valves $V_D$ and suction valves $V_S$ to be arranged one behind the other in the circumferential direction and so as to be offset in the direction of extent of the central axis M. It would furthermore be possible for the pressure valves $V_D$ and suction valves $V_S$ to be arranged in groups, for example by virtue of 2 valves V being designed as pressure valves $V_D$, and the respective third valve V being designed as a suction valve $V_S$, in the circumferential direction.

Figure 23:
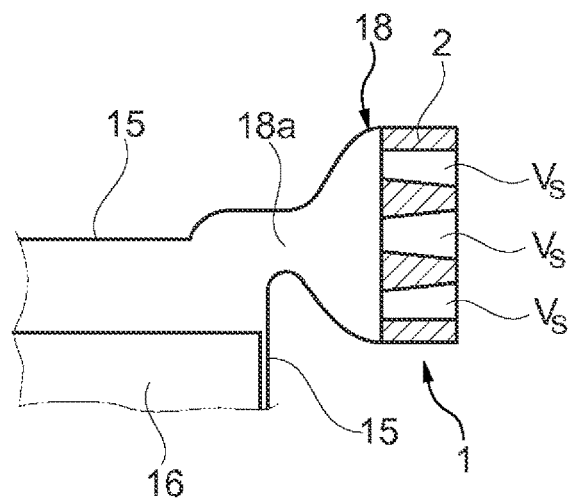
FIG. 23 shows a poppet valve having a valve body with a multiplicity of valves arranged therein.

FIGS. 23 and 24 show two further exemplary embodiments of a poppet valve 1 comprising in each case one valve body 2 with a multiplicity of pressure valves $V_D$ arranged thereon or therein. The poppet valve 1 is connected in fluid-conducting fashion to the interior space formed from a cylinder 15 and a piston 16 via a so-called valve nest 18 and an outlet duct 18a. The exemplary embodiments show only pressure valves $V_D$. It would however also be possible to provide an arrangement of only suction valves $V_S$, such that the interior space opens out via an inlet duct 18a and the valve nest 18 to the poppet valve 1. In the exemplary embodiments as per FIGS. 23 and 24, both suction valves $V_S$ and pressure valves $V_D$ may be arranged in the poppet valve 1 or in the valve body 2, such that an inlet and outlet duct 18a connects the cylinder interior space to the valve nest 18 and to the poppet valve 1.

The valve body 2 may be designed in a multiplicity of embodiments, such that the exemplary embodiments of valve body 2 illustrated in FIGS. 2, 23 and 24 are to be understood merely as examples. An advantage of the poppet valve 1 according to the invention can be seen in the fact that the valve body 2 may have a multiplicity of shapes in which the valves V are arranged as illustrated in the exemplary embodiments. The poppet valve 1 according to the invention may, depending on requirements, have suction or pressure valves $V_S$, $V_D$ or a combination of both valves.

In one advantageous embodiment, the poppet valve 1 for a piston compressor comprises a cage 3, a valve body 2 with a multiplicity of inlet ducts 2a, wherein each inlet duct 2a opens into a valve seat 7a, and comprises a multiplicity of closing elements 4 which are movable in an axial direction A, wherein each inlet duct 2a is assigned a closing element 4, and wherein the valve seat 7a is arranged so as to be situated opposite the associated closing element 4 in the axial direction A in such a way that the valve seat 7a is closable by the closing element 4, wherein a spring 5 is arranged between the cage 3 and the closing element 4 in order to subject the closing element 4 to a preload force directed toward the valve seat 7a, wherein, on the cage 3, there is arranged a guide part 6 which extends in the axial direction A and on which the closing element 4 is guided movably in the axial direction A, wherein the closing element 4 comprises a closing head 4a and a guide section 4b, wherein the closing head 4a and the guide section 4b follow one another in the axial direction A, wherein the closing element 4, proceeding from the guide section 4b, has a guide interior space 4c which extends in the axial direction A into the interior of the closing element 4 in the direction of the closing head 4a and in which the guide part 6 also extends, wherein the closing head 4a has a face side 4g which widens in the axial direction A in the direction toward the guide section 4b up to a maximum circumference 4q, wherein the maximum circumference 4q has a circumference central point $M_F$, and wherein the guide interior space 4c extends in the direction of the closing head 4a at least to such an extent that the circumference central point $M_F$ comes to lie within the guide interior space 4c.

The poppet valve is preferably designed such that the circumference central point $M_F$ comes to lie within the profile of the guide part 6 at least when the closing element 4 is fully open, as illustrated for example in FIG. 6.

The poppet valve is preferably designed such that the circumference central point $M_F$ comes to lie within the profile of the guide part 6 also when the closing element 4 is closed.

The poppet valve is preferably designed such that the face side 4g is designed to substantially or regionally extend in conical or arrow-shaped fashion, as illustrated for example in FIG. 5, 6 or 16.

The poppet valve is preferably designed such that the surface of the face side 4g has, at least in the region of its periphery, a gradient angle α of at least 10° with respect to a normal to the axial direction A, as illustrated for example in FIG. 11.

The poppet valve is preferably designed such that the face side 4g has, at least in sections along the surface from the periphery toward the center, a concavely extending section 4i, as illustrated for example in FIGS. 6, 15 and 16.

The poppet valve is preferably designed such that the guide section 4b has an outer contour with a diameter which becomes progressively smaller in the direction of the cage 3, as illustrated for example in FIG. 2, 5 or 6. The guide section 4b thus has a relatively low flow resistance.

The poppet valve is preferably designed such that the guide part 6 and the guide section 4b have a circular cross section, such that these together form a longitudinal guide and in particular a plain bearing.

The poppet valve is preferably designed such that the guide section 4b comprises a first guide interior space 4c with a relatively small interior cross section and, following this in the axial direction A, a second guide interior space 4n with a relatively large interior cross section, as illustrated for example in FIG. 14.

The poppet valve is preferably designed such that a transition point is formed, in particular as a narrowing or as a shoulder, between the first guide interior space 4c and the second guide interior space 4n, as illustrated for example in FIG. 14.

The poppet valve is preferably designed such that the guide part 6 has a section with a relatively small diameter 6g and a section with a relatively large diameter 6h, which bear against the first and second guide interior space 4c, 4n respectively, as illustrated for example in FIG. 14.

The poppet valve is preferably designed such that the guide section 4b has, at the opposite end in relation to the closing head 4a, a first stop 4d with an enlarged wall thickness, as illustrated for example in FIG. 15 or 16.

The poppet valve is preferably designed such that the closing head 4a has, in the direction of the guide section 4b, a support 4f which extends in the circumferential direction in relation to the axial direction A and which serves for supporting the spring 5, as illustrated for example in FIG. 15 or 16.

The poppet valve is preferably designed such that the closing element 4 has, following the guide section 4b, a spring section 4m which extends in the axial direction A, as illustrated for example in FIG. 18.

The poppet valve is preferably designed such that, on the closing head 4a, there is arranged a termination 4h which projects in the axial direction A above the surface of the closing head 4a and the interior space of which forms part of the guide interior space 4c, as illustrated for example in FIG. 18.

The poppet valve is preferably designed such that the closing head 4a is composed substantially of a sealing surface which extends in ring-shaped fashion and which is arranged so as to abut against the valve seat 7a, wherein the closing head 4a is connected to the guide section 4b by means of a connecting part 4l, as illustrated for example in FIG. 17.

The closing element 4 for a poppet valve 1 of a piston compressor comprises a closing head 4a and a guide section 4b, wherein the closing head 4a and the guide section 4b follow one another in an axial direction A, wherein the closing element 4, proceeding from the guide section 4b, has a guide interior space 4c which extends in the axial direction A into the interior of the closing element 4 in the direction of the closing head 4a, wherein the closing head 4a has a face side 4g which widens in the axial direction A in the direction toward the guide section 4b up to a maximum circumference 4q, wherein the maximum circumference 4q has a circumference central point $M_F$, and wherein the guide interior space 4c extends in the direction of the closing head 4a at least to such an extent that the circumference central point $M_F$ comes to lie within the guide interior space 4c.

The invention claimed is:

1. A poppet valve for a piston compressor, comprising a cage, a valve body with a multiplicity of inlet ducts, wherein each inlet duct opens into a valve seat, and comprising a multiplicity of closing elements which are movable in an axial direction (A), wherein each inlet duct assigned a closing element, and wherein the valve seat is arranged so as to be situated opposite the associated closing element in the axial direction (A) in such a way that the valve seat is closable by the closing element, wherein a spring is arranged between the cage and the closing element in order to subject the closing element to a preload force directed toward the valve seat, wherein the spring encloses an interior space, and wherein, on the cage, there is arranged a guide part which extends in the axial direction up to a guide part end, wherein the closing element on the guide part is mounted movably, in particular slidingly, in the axial direction (A), characterized in that the spring encloses the guide part and the closing element from the outside in an axial direction (A) along a partial section, such that both the guide part and the closing element are, along said partial section, arranged within the interior space of the spring, and that the guide part extending from the cage further in the axial direction (A) to the guide part end subsequent to the partial section.

2. The poppet valve as claimed in claim 1, wherein the valve body is designed in the form of a cover.

3. The poppet valve as claimed in claim 1, wherein the valve body extends in a circumferential direction about a central axis (M) and is of hollow cylindrical design with respect to the central axis (M).

4. The poppet valve as claimed in claim 2, wherein the closing element has a face side seat, wherein the face side widens in the axial direction (A) toward the cage up to a maximum circumference, in that the maximum circumference has a circumference central point, and in that the circumference central point ($M_F$) comes to lie within the profile of the guide part at least when the closing element is fully open.

5. The poppet valve as claimed in claim 4, wherein the circumference central point ($M_F$) comes to lie within the profile of the guide part also when the closing element is closed.

6. The poppet valve as claimed in claim 1, wherein the spring is designed as a spiral spring.

7. The poppet valve as claimed in claim 1, wherein the spring has a first spring end and a second spring end, and in that the spring has a diameter which increases in the axial direction toward the valve seat, such that the first spring end, directed toward the valve seat, has a greater diameter than the second spring end.

8. The poppet valve as claimed in claim 7, wherein the spring widens in conical fashion toward the valve seat.

9. The poppet valve as claimed in claim 7, wherein the closing element comprises a closing head in that the closing head has a support on the side averted from the valve seat, and in that the first spring end lies on the support.

10. The poppet valve as claimed in claim 9, wherein the closing element and the spring are designed in a manner adapted to one another such that the spring makes contact with the closing element only at the support.

11. The poppet valve as claimed in claim 4, wherein the guide part is of cylindrical design, in that the closing element has a bore, and in that the guide part and the bore are designed in a manner adapted to one another such that they form a linear bearing, in particular a plain bearing.

12. The poppet valve as claimed in claim 11, wherein the closing element is composed of a closing head and, following the latter in a direction of extent of the axis (A), a guide section, wherein the closing element is of concentric design and, in the center, has the bore.

13. The poppet valve as claimed in claim 4, wherein the guide part is of hollow cylindrical design, in that the closing element comprises a cylindrical guide section, and in that the guide part and the guide section are designed in a manner adapted to one another such that they form a linear bearing, in particular a plain bearing.

14. The poppet valve as claimed in claim 4, wherein the valve seat is designed as a separate valve seat ring, which is arranged in the valve seat cover.

15. The poppet valve as claimed in claim 1, wherein the guide part has, toward the inlet opening a spherical end part.

16. The poppet valve as claimed in claim 1, wherein the cage has a holding structure on which the guide parts are arranged, wherein the holding structure has intermediate spaces.

17. The poppet valve as claimed in claim 16, wherein the holding structure is designed as a grid structure comprising a multiplicity of struts and junctions and intermediate spaces, wherein the guide parts are arranged in the junctions.

18. The poppet valve as claimed in claim 16, wherein the cage has a hollow cylindrical outer wall which runs in the axial direction (A) and which encloses the holding structure in the circumferential direction.

19. A piston compressor comprising a poppet valve as claimed in claim 1.

* * * * *

UNITED STATES PATENT AND TRADEMARK OFFICE
CERTIFICATE OF CORRECTION

PATENT NO.          : 10,436,203 B2                                  Page 1 of 1
APPLICATION NO.     : 15/767601
DATED               : October 8, 2019
INVENTOR(S)         : Reiner Schulz et al.

It is certified that error appears in the above-identified patent and that said Letters Patent is hereby corrected as shown below:

In the Claims

Column 14, Lines 22-23, Claim 4:
After "wherein the closing element has a face side"
Insert -- facing toward the valve --.

Signed and Sealed this
Seventeenth Day of March, 2020

Andrei Iancu
*Director of the United States Patent and Trademark Office*